US012368730B2

(12) United States Patent
Teuwen et al.

(10) Patent No.: US 12,368,730 B2
(45) Date of Patent: Jul. 22, 2025

(54) AUTOMATIC THREAT ACTOR ATTRIBUTION BASED ON MULTIPLE EVIDENCE

(71) Applicant: FORESCOUT TECHNOLOGIES, INC., San Jose, CA (US)

(72) Inventors: Koen Theodora Wilhelmina Teuwen, Eindhoven (NL); Alessandro Manzi, Vecchiano (IT); Daniel Ricardo dos Santos, Rotterdam (NL); Elisa Costante, Eindhoven (NL)

(73) Assignee: Forescout Technologies, Inc., San Jose, CA (US)

( * ) Notice: Subject to any disclaimer, the term of this patent is extended or adjusted under 35 U.S.C. 154(b) by 369 days.

(21) Appl. No.: 18/121,682

(22) Filed: Mar. 15, 2023

(65) Prior Publication Data

US 2024/0064158 A1 Feb. 22, 2024

Related U.S. Application Data

(60) Provisional application No. 63/371,679, filed on Aug. 17, 2022.

(51) Int. Cl.
*H04L 9/40* (2022.01)
*G06F 21/55* (2013.01)

(52) U.S. Cl.
CPC ........ *H04L 63/1416* (2013.01); *G06F 21/554* (2013.01); *H04L 9/40* (2022.05); *H04L 63/1425* (2013.01)

(58) Field of Classification Search
CPC ... H04L 63/1416; H04L 63/1425; H04L 9/40; G06F 21/554
See application file for complete search history.

(56) References Cited

U.S. PATENT DOCUMENTS 10,027,696 B1 * 7/2018 Rivlin ................... H04L 51/212
10,320,827 B2 * 6/2019 Crabtree ............. H04L 63/1433
(Continued)

OTHER PUBLICATIONS

Arafune, M., Rajalakshmi, S., Jaldon, L., Jadidi, Z., Pal, S., Foo, E. and Venkatachalam, N., Mar. 2022. Design and development of automated threat hunting in industrial control systems. In 2022 IEEE International Conference on Pervasive Computing and Communications Workshops. (pp. 618-623). IEEE. (Year: 2022).*

(Continued)

*Primary Examiner* — Philip J Chea
*Assistant Examiner* — Dorianne Alvarado David
(74) *Attorney, Agent, or Firm* — Womble Bond Dickinson (US) LLP

(57) ABSTRACT

Systems, methods, and related technologies for threat attribution are described. A method includes accessing network traffic to determine an incident based on a correlation of events as being associated with a same coordinated attack. The incident includes indicators of compromise (IoCs) and a Tactics, Techniques and Procedures (TTPs). The method also includes computing a first probability function based on the IoCs, wherein the first probability function comprises a first set of probability of attributions for a first list of known threat actors, and computing a second probability function based on the TTPs, wherein the second probability function comprises a second set of probability of attributions for a second list of known threat actors. The method also includes generating an aggregate probability function by combining the first probability function and the second probability function, using the aggregate probability function to derive attribution information, and storing the attribution information with the incident.

20 Claims, 7 Drawing Sheets

(56) References Cited

U.S. PATENT DOCUMENTS

| | | | | |
|---|---|---|---|---|
| 10,902,114 | B1* | 1/2021 | Trost | G06F 16/26 |
| 2005/0114161 | A1* | 5/2005 | Garg | G06Q 30/02 |
| | | | | 703/2 |
| 2017/0208084 | A1* | 7/2017 | Steelman | H04L 63/0209 |
| 2020/0007560 | A1* | 1/2020 | Niemela | H04L 63/1425 |
| 2020/0092595 | A1* | 3/2020 | Coleman | H04N 21/23418 |
| 2020/0382525 | A1* | 12/2020 | Scheideler | G06F 11/327 |
| 2021/0173924 | A1* | 6/2021 | Trost | G06F 16/288 |
| 2021/0281585 | A1* | 9/2021 | Warikoo | H04L 63/1408 |
| 2022/0019670 | A1* | 1/2022 | Moriarty | G06F 21/554 |
| 2022/0385675 | A1* | 12/2022 | Tora | G06N 5/04 |
| 2023/0156017 | A1* | 5/2023 | Tyagi | H04L 63/20 |
| | | | | 726/22 |
| 2023/0205888 | A1* | 6/2023 | Tyagi | G06F 21/577 |
| | | | | 726/26 |
| 2023/0229785 | A1* | 7/2023 | Jurado | G06F 3/0483 |
| | | | | 726/25 |
| 2023/0275908 | A1* | 8/2023 | Mace | G06F 21/554 |
| | | | | 726/23 |

OTHER PUBLICATIONS

Bromander, S., Jã,sang, A. and Eian, M., 2016. Semantic Cyberthreat Modelling. STIDS, pp. 74-78. (Year: 2016).*

Databricks. (2022). Hunting for IOCs Without Knowing Table Names of Field Labels. https://www.databricks.com/blog/2022/07/15/hunting-for-iocs-without-knowing-table-names-or-field-labels.html (Year: 2022).*

Du et al. Aug. 2020. SoK: Exploring the state of the art and the future potential of artificial intelligence in digital forensic investigation. In Proceedings of the 15th international conference on availability, reliability and security (pp. 1-10). (Year: 2020).*

Fan, F.L., Xiong, J., Li, M. and Wang, G., 2021. On interpretability of artificial neural networks: A survey. IEEE Transactions on Radiation and Plasma Medical Sciences, 5(6), pp. 741-760. (Year: 2021).*

Gao, P., Shao, F., Liu, X., Xiao, X., Qin, Z., Xu, F., Mittal, P., Kulkarni, S.R. and Song, D., Apr. 2021. Enabling efficient cyber threat hunting with cyber threat intelligence. In 2021 IEEE 37th International Conference on Data Engineering (ICDE) (pp. 193-204). IEEE. (Year: 2021).*

Goel, S. and Nussbaum, B., 2021. Attribution across cyber attack types: network intrusions and information operations. IEEE Open Journal of the Communications Society, 2, pp. 1082-1093. (Year: 2021).*

Kim, K., Shin, Y., Lee, J., & Lee, K. (2021). Automatically Attributing Mobile Threat actors by Vectorized ATT&CK Matrix and Paired Indicator. Sensors, 21(19), 6522. https://doi.org/10.3390/s21196522 (Year: 2021).*

Koliander, G., El-Laham, Y., DjuriÄ, P.M. and Hlawatsch, F., 2022. Fusion of probability density functions. Proceedings of the IEEE, 110(4), pp. 404-453. (Year: 2022).*

Nisioti, A., Mylonas, A., Yoo, P.D. and Katos, V., 2018. From intrusion detection to attacker attribution: A comprehensive survey of unsupervised methods. IEEE Communications Surveys & Tutorials, 20(4), pp. 3369-3388. (Year: 2018).*

Noor, U., Anwar, Z., Amjad, T. and Choo, K.K.R., 2019. A machine learning-based FinTech cyber threat attribution framework using high-level indicators of compromise. Future Generation Computer Systems, 96, pp. 227-242. (Year: 2019).*

Pahi, T. and Skopik, F., Jul. 2019. Cyber attribution 2.0: Capture the false flag. In proceedings of the 18th European conference on cyber warfare and security (ECCWS 2019) (pp. 338-345). (Year: 2019).*

Rid, T. and Buchanan, B., 2015. Attributing cyber attacks. Journal of strategic studies, 38(1-2), pp. 4-37. (Year: 2015).*

Selby, R.W., 2005. Enabling reuse-based software development of large-scale systems. IEEE Transactions on Software Engineering, 31(6), pp. 495-510. (Year: 2005).*

Skopik, F. and Pahi, T., 2020. Under false flag: using technical artifacts for cyber attack attribution. Cybersecurity, 3, pp. 1-20. (Year: 2020).*

Tounsi, W. and Rais, H., 2018. A survey on technical threat intelligence in the age of sophisticated cyber attacks. Computers & security, 72, pp. 212-233. (Year: 2018).*

Yeboah-Ofori, A., Islam, S., Lee, S.W., Shamszaman, Z.U., Muhammad, K., Altaf, M. and Al-Rakhami, M.S., 2021. Cyber threat predictive analytics for improving cyber supply chain security. IEEE Access, 9, pp. 94318-94337. (Year: 2021).*

* cited by examiner

AUTOMATIC THREAT ACTOR ATTRIBUTION BASED ON MULTIPLE EVIDENCE

RELATED APPLICATIONS

This application claims priority from and the benefit of U.S. Provisional Patent Application No. 63/371,679 filed on Aug. 17, 2022, the entire contents of which are incorporated herein by reference in their entirety.

TECHNICAL FIELD

Aspects and implementations of the present disclosure relate to cyber security, and more specifically, to automatic threat actor attribution.

BACKGROUND

A computer network can include multiple computing devices communicatively coupled to each other over physically wired, optical, or wireless radio-frequency technology. A computer network can have a variety of network topologies with a variety of devices in different regions of the network. As technology advances, the number and variety of devices that communicate over computer networks are rapidly increasing. Each device or entity may have its own respective vulnerabilities which may leave the network open to compromise or other risks. Preventing the spreading of an infection of a device or entity, or an attack through a network can be important for securing a communication network. Known methodologies such as attacker behaviors, steps taken by threat actors to achieve their goals, and indicators of those threat actors are collected in cyber threat intelligence that can be used by security analysts to identify and mitigate threats to a network.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
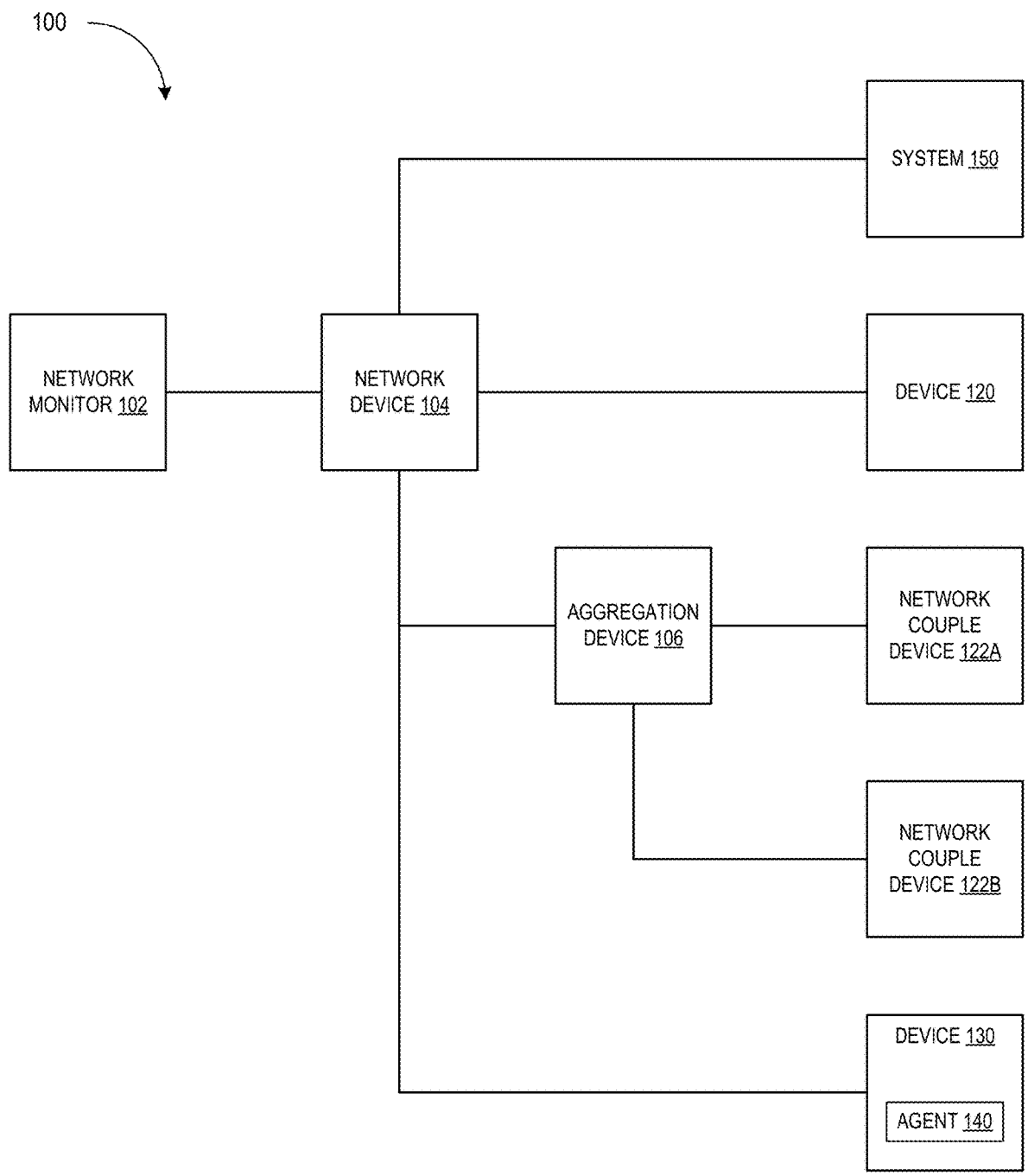
FIG. 1 depicts an illustrative communication network in accordance with some embodiments of the present disclosure.

Aspects and implementations of the present disclosure are directed to attributing a cybersecurity incident (e.g., a cyber attack) to a threat actor. The systems and methods disclosed can be employed with respect to network management, among other fields.

Unlike conventional solutions, aspects of the present disclosure may perform attribution from several very different sources of information in a unified and meaningful way. Aspects of the present disclosure include a modular approach to perform attribution for different sources of information combined with an aggregation solution that joins the different sources into a single output using opinion pools. Contrary to conventional solutions, aspects of the present disclosure are highly modular and allows for composing different attributors at runtime. Attributors (e.g., indicators of compromise (IoC) attributors, tactics, techniques, and procedures (TTP) attributors, etc.) can be used interchangeably since they use a common interface that operates on the same data model, which consist of incidents composed of multiple alerts as input and Probability Functions as output. When a cyberattack occurs, multiple observables can be used to attribute that incident to a specific threat actor, such as a ransomware gang or a state-sponsored advanced persistent threat (APT). These observables include indicators of compromise (IoCs) such as IP addresses, domain names and file hashes, as well as standardized behaviors commonly known as Tactics, Techniques and Procedures (TTPs). Some observables, such as domain names and IP addresses, can often be uniquely mapped to an adversary, but others, such as file hashes and TTPs, are typically shared by many adversaries. Incidents may also contain new IoCs that have not yet been mapped to any adversary, such as a new IP address or domain name. If threat attribution is performed for an incident that contains new IoCs, that can provide evidence linking the observed IoCs to the actor and this can be shared with the security community in the form of new Cyber Threat Intelligence (CTI). Thus, when an improved attributor for existing IoC types or a new attributor for new IoC types is implemented, the new attributor can easily replace previously implemented attributors.

Systems, methods, techniques, and related technologies are described herein in various implementations that includes a network monitor that may access network traffic. The network monitor may determine one or more observables in view of the network traffic. The network monitor may determine a threat actor in view of the one or more observables.

The network monitor may include one or more processing devices (e.g., computer systems such as laptops, desktops, servers, mobile devices, IoT devices, OT devices, etc.), endpoints, virtual machines, services, serverless services (e.g., cloud-based services), containers (e.g., user-space instances that work with an operating system featuring a kernel that allows the existence of multiple isolated user-space instances), cloud-based storage, and other components. Depending on the device, a device may have an IP address (e.g., a device) or may be without an IP address (e.g., a serverless service).

Enforcement points may be one or more network devices (e.g., firewalls, routers, switches, virtual switch, hypervisor, SDN controller, virtual firewall, etc.) that are able to enforce access or other rules, ACLs, or the like to control (e.g., allow or deny) communication and network traffic (e.g., including dropping packets) between the device and one or more other devices communicatively coupled to a network. Access rules may control whether a device can communicate with other devices in a variety of ways including, but not limited to, blocking communications (e.g., dropping packets sent to one or more particular entities), allowing communication between particular devices (e.g., a desktop and a printer), allowing communication on particular ports, etc. It is appreciated that an enforcement point may be any device that is capable of filtering, controlling, restricting, or the like communication or access on a network.

FIG. 1 depicts an illustrative communication network 100 in accordance with some embodiments of the present disclosure. The communication network 100 includes a network monitor 102, a network device 104, an aggregation device 106, a system 150, devices 120 and 130, and network coupled devices 122a-b. The devices 120 and 130 and network coupled devices 122a-b may be any of a variety of devices including, but not limited to, computing systems, laptops, smartphones, servers, Internet of Things (IoT) or smart devices, supervisory control and data acquisition (SCADA) devices, operational technology (OT) devices, campus devices, data center devices, edge devices, etc. It is noted that the devices of communication network 100 may communicate in a variety of ways including wired and wireless connections and may use one or more of a variety of protocols.

Network device 104 may be one or more network devices configured to facilitate communication among aggregation device 106, system 150, the network monitor 102, devices 120 and 130, and network coupled devices 122a-b. Network device 104 may be one or more network switches, access points, routers, firewalls, hubs, etc.

The network monitor 102 may be operable for a variety of tasks including obtaining one or more classification candidates from one or more sources and selecting a classification candidate from the one or more sources based on one or more criteria, wherein the classification candidate is used to classify an endpoint. In some embodiments, the network monitor 102 can use local resources (e.g., processing, memory, data resources, or other resources), cloud resources, or a combination thereof for such an operation. In various embodiments, various libraries or an application programming interface (API) may be used to perform the operations of the network monitor 102.

The network monitor 102 can determine one or more enforcement points where the device is communicatively coupled to the network and thereby determine the one or more enforcement points closest to the device. For example, the network monitor 102 may access information on a switch (e.g., a switch cache) to determine a port (e.g., physical port, wireless port, or virtual port) where a device with a particular IP address or MAC address or other identifier is communicatively coupled. The network monitor 102 may also access information from a wireless access point where the device is communicatively coupled. In some embodiments, the network monitor 102 may poll information from a cloud service to determine where a device is communicatively coupled or connected to a network. In various embodiments, the network monitor 102 can access syslog or SNMP information from a device itself to determine where a device is communicatively coupled or connected to a network (e.g., without accessing information from a network device or enforcement point). The network monitor 102 supports applying access policies in situations where a device is communicatively coupled to a network with more than one connection (e.g., a wired connection and a wireless connection).

Based on the enforcement point, the network monitor 102 may determine the one or more access rules to be assigned to the one or more enforcement points based on an access policy. In some embodiments, based on information about the one or more enforcement points closest to the device, the network monitor 102 translates the access policy into one or more commands that will be used to configure the access rules on the one or more enforcement points. The closest enforcement point to a device can be enforcement point where the device is communicatively coupled. The enforcement point may be network device or network infrastructure device closest in proximity (e.g., physical proximity) to the device. The enforcement point comprises the port where the device is communitive coupled to the network, and communication to and from the device is sent first through that port. In some embodiments, the port of the enforcement point is the last point of communication within network infrastructure before communication is sent to the device. In various embodiments, the closest enforcement point is where communication from the device is initially sent when communications are sent from the device (e.g., prior to communications with the network backbone or Internet backbone). For example, the closest enforcement to a device connected to a switch is the switch. As another example, the closest enforcement point to a device wirelessly communicatively coupled to a wireless access point is the wireless access point. In various embodiments, the network monitor 102 may access the current configuration of the one or more enforcement points to determine the access rules (e.g., ACLs) that are to be applied to the one or more enforcement points, as described herein. In some embodiments, a device is communicatively coupled to a wireless controller via a wireless access point and the wireless controller or a switch is the closest enforcement point (e.g., based on the wireless controller or the switch being able to apply access rules, for instance ACLs, to communications of the device, for instance, in the case where the wireless access point is not able to or does not have the functionality to apply access rules). In various embodiments, a device is communicatively coupled to a layer 3 switch via a layer 2 switch and the layer 3 switch is the closest enforcement point (e.g., based on the layer 3 switch being able to apply access rules, for instance ACLs, to communications of the device, for instance, in the case where the layer 2 switch is not able to or does not have the functionality to apply access rules).

The network monitor 102 may then apply or assign the access rules to the one or more enforcement points closest to the device. The network monitor 102 may communicate the access rules via application programming interfaces (APIs), command line interface (CLI) commands, Web interface, simple network management protocol (SNMP) interface, etc. In some embodiments, the network monitor 102 may verify that the one or more enforcement points have been properly or correctly configured based on the access rules.

The network monitor 102 may provide an interface (e.g., a graphical user interface (GUI)) for viewing, monitoring, and modifying classification or associated thresholds associated with one or more models. The network monitor 102 may further monitor network traffic over time to reclassify entities as new entities join the network, entities rejoin the network, and new models are made available.

The network monitor 102 may further perform a variety of operations including identification of cyber incidents and taking one or more remediation actions (e.g., changing network access of a device, changing the virtual local area network (VLAN), sending an email, sending a short message service (SMS) message, etc.).

The network monitor 102 may also parse network traffic. For example, the network monitor 102 may parse (e.g., read, analyze, access, etc.) different protocol fields of the network traffic (e.g., packets, messages, frames, etc.). The network monitor 102 may provide the field values of the protocol fields (e.g., values of certain portions of network packets, messages, frames, etc.) to one or more different processing engines (e.g., rule engines, machine learning models, etc.) that may request the protocol fields, as discussed in more detail below.

An enforcement point may be a router, firewall, switch, hypervisor, software-defined networking (SDN) controller, virtual firewall, or other network device or infrastructure that may have an ACL like or rule like policy or functionality to apply based on the port where a device is communicatively coupled thereto. Enforcements points may also be a next generation firewall (NGFW) and cloud infrastructure. A NGFW can be updated with an ACL like policy regarding a device accessing the Internet. Cloud infrastructure (e.g., Amazon web services (AWS) security groups) can be updated to drop packets from the IP of the device that have a destination outside the cloud. Embodiments are operable to configure enforcement points at the edge of a network where a device is communicatively coupled thereto thereby controlling access of the device on a customized basis (e.g., customized or tailored for the device).

In some embodiments, if the categorization or characteristics functionality is being updated (e.g., which could result in a change in one or more access rules that are assigned to an enforcement point closest a device and thus impact the enforcement of an access policy by the enforcement points), notifications may be sent (e.g., via email or other methods as described herein) or presented to a user (e.g., via a graphical user interface (GUI)) to indicate that the categorization or characteristics of one or more entities is changing and should be confirmed before one or more enforcement points are updated based on the changed categorization or characteristics. After confirmation, the access rules may be changed.

The network monitor 102 may be a computing system, network device (e.g., router, firewall, an access point), network access control (NAC) device, intrusion prevention system (IPS), intrusion detection system (IDS), deception device, cloud-based device, virtual machine based system, etc. The network monitor 102 may be communicatively coupled to the network device 104 in such a way as to receive network traffic flowing through the network device 104 (e.g., port mirroring, sniffing, acting as a proxy, passive monitoring, etc.). In some embodiments, the network monitor 102 may include one or more of the aforementioned devices. In various embodiments, the network monitor 102 may further support high availability and disaster recovery (e.g., via one or more redundant devices).

In some embodiments, the network monitor 102 may monitor a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), etc.).

The monitoring of entities by the network monitor 102 may be based on a combination of one or more pieces of information including traffic analysis, information from external or remote systems (e.g., system 150), communication (e.g., querying) with an aggregation device (e.g., aggregation device 106), and querying the device itself (e.g., via an application programming interface (API), command line interface (CLI), web interface, simple network management protocol (SNMP), etc.). The network monitor 102 may be operable to use one or more APIs to communicate with aggregation device 106, device 120, device 130, or system 150. The network monitor 102 may monitor for or scan for entities that are communicatively coupled to a network via a NAT device (e.g., firewall, router, etc.) dynamically, periodically, or a combination thereof.

Information from one or more external or third-party systems (e.g., system 150) may further be used for determining one or more tags or characteristics for a device. For example, a vulnerability assessment (VA) system may be queried to verify or check if a device is in compliance and provide that information to the network monitor 102. External or third-party systems may also be used to perform a scan or a check on a device to determine a software version.

Device 130 can include agent 140. The agent 140 may be a hardware component, software component, or some combination thereof configured to gather information associated with device 130 and send that information to the network monitor 102. The information can include the operating system, version, patch level, firmware version, serial number, vendor (e.g., manufacturer), model, asset tag, software executing on a device (e.g., anti-virus software, malware detection software, office applications, web browser(s), communication applications, etc.), services that are active or configured on the device, ports that are open or that the device is configured to communicate with (e.g., associated with services running on the device), media access control (MAC) address, processor utilization, unique identifiers, computer name, account access activity, etc. The agent 140 may be configured to provide different levels and pieces of information based on device 130 and the information available to agent 140 from device 130. Agent 140 may be able to store logs of information associated with device 130. The network monitor 102 may utilize agent information from the agent 140. While the network monitor 102 may be able to receive information from agent 140, installation or execution of agent 140 on many entities may not be possible, e.g., IoT or smart devices.

System 150 may be one or more external, remote, or third-party systems (e.g., separate) from the network monitor 102 and may have information about devices 120 and 130 and network coupled devices 122a-b. System 150 may include a vulnerability assessment (VA) system, a threat detection (TD) system, endpoint management system, a mobile device management (MDM) system, a firewall (FW) system, a switch system, an access point system, etc. The network monitor 102 may be configured to communicate with system 150 to obtain information about devices 120 and 130 and network coupled devices 122a-b on a periodic basis, as described herein. For example, system 150 may be a vulnerability assessment system configured to determine if device 120 has a computer virus or other indicator of compromise (IOC).

The vulnerability assessment (VA) system may be configured to identify, quantify, and prioritize (e.g., rank) the vulnerabilities of a device. The VA system may be able to catalog assets and capabilities or resources of a device, assign a quantifiable value (or at least rank order) and importance to the resources, and identify the vulnerabilities or potential threats of each resource. The VA system may provide the aforementioned information for use by the network monitor 102.

The advanced threat detection (ATD) or threat detection (TD) system may be configured to examine communications that other security controls have allowed to pass. The ATD system may provide information about a device including, but not limited to, source reputation, executable analysis, and threat-level protocols analysis. The ATD system may thus report if a suspicious file has been downloaded to a device being monitored by the network monitor 102.

Endpoint management systems can include anti-virus systems (e.g., servers, cloud-based systems, etc.), next-generation antivirus (NGAV) systems, endpoint detection and response (EDR) software or systems (e.g., software that record endpoint-system-level behaviors and events), compliance monitoring software (e.g., checking frequently for compliance).

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for device monitoring (e.g., including device communications) by the network monitor 102.

The firewall (FW) system may be configured to monitor and control incoming and outgoing network traffic (e.g., based on security rules). The FW system may provide information about a device being monitored including attempts to violate security rules (e.g., unpermitted account access across segments) and network traffic of the device being monitored.

The switch or access point (AP) system may be any of a variety of network devices (e.g., network device 104 or aggregation device 106) including a network switch or an access point, e.g., a wireless access point, or combination thereof that is configured to provide a device access to a network. For example, the switch or AP system may provide MAC address information, address resolution protocol (ARP) table information, device naming information, traffic data, etc., to the network monitor 102 which may be used to monitor entities and control network access of one or more entities. The switch or AP system may have one or more interfaces for communicating with IoT or smart devices or other devices (e.g., ZigBee™, Bluetooth™, etc.), as described herein. The VA system, ATD system, and FW system may thus be accessed to get vulnerabilities, threats, and user information of a device being monitored in real-time which can then be used to determine a risk level of the device.

Aggregation device 106 may be configured to communicate with network coupled devices 122a-b and provide network access to network coupled devices 122a-b. Aggregation device 106 may further be configured to provide information (e.g., operating system, device software information, device software versions, device names, application present, running, or both, vulnerabilities, patch level, etc.) to the network monitor 102 about the network coupled devices 122a-b. Aggregation device 106 may be a wireless access point that is configured to communicate with a wide variety of devices through multiple technology standards or protocols including, but not limited to, Bluetooth™, Wi-Fi™, ZigBee™, Radio-frequency identification (RFID), Light Fidelity (Li-Fi), Z-Wave, Thread, Long Term Evolution (LTE), Wi-Fi™, HaLow, HomePlug, Multimedia over Coax Alliance (MoCA), and Ethernet. For example, aggregation device 106 may be coupled to the network device 104 via an Ethernet connection and coupled to network coupled devices 122a-b via a wireless connection. Aggregation device 106 may be configured to communicate with network coupled devices 122a-b using a standard protocol with proprietary extensions or modifications.

Aggregation device 106 may further provide log information of activity and properties of network coupled devices 122a-b to the network monitor 102. It is appreciated that log information may be particularly reliable for stable network environments (e.g., where the types of devices on the network do not change often). The log information may include information of updates of software of network coupled devices 122a-b.

Figure 2:
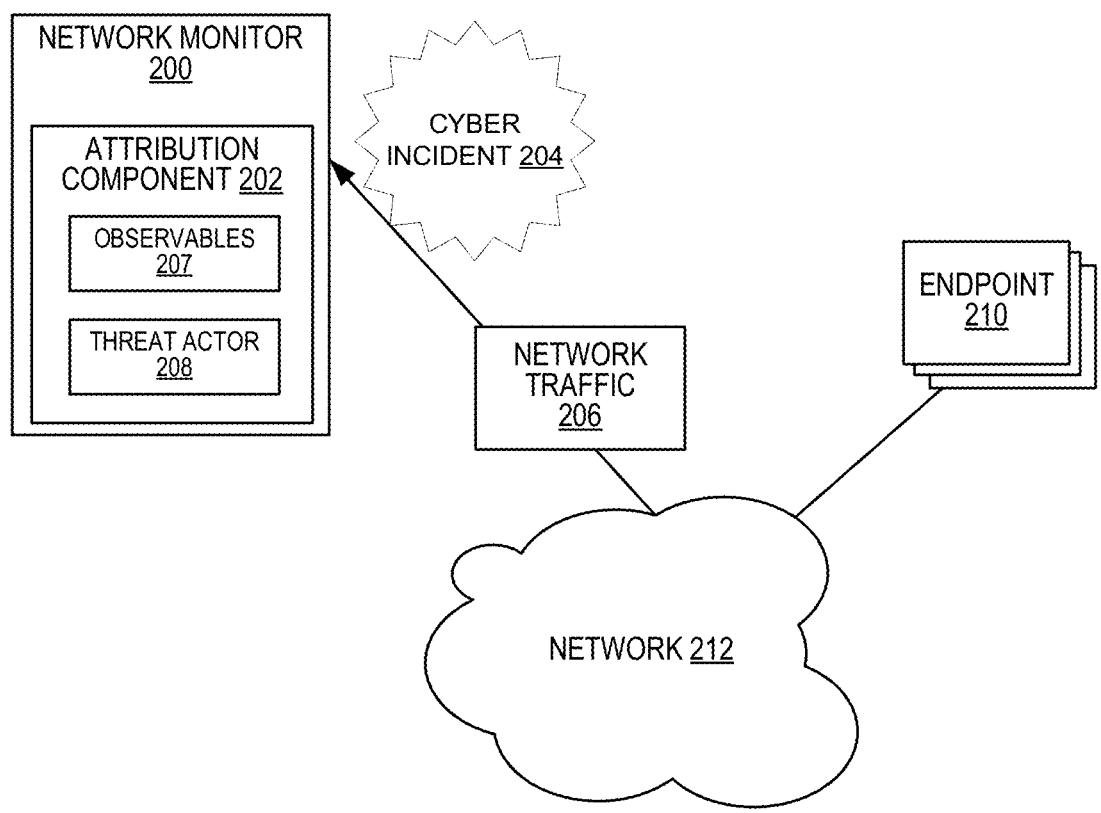
FIG. 2 depicts an illustrative computer network with an attribution component 202 in accordance with some embodiments of the present disclosure.

FIG. 2 depicts an illustrative computer network with an attribution component 202 in accordance with some embodiments of the present disclosure. As shown in FIG. 2, the attribution component 202 may be included in a network monitor 200. In some embodiments, the network monitor 200 may the same as the network monitor 102 shown in FIG. 1.

The network monitor 200 may be communicatively coupled to a computing network 212. Similarly, one or more endpoints (EP) 210 may be communicatively coupled to the network 212. An endpoint may include one or more computing devices, such as, for example, computer servers, IoT devices (e.g., a television, sensors, appliances, medical equipment, exercise equipment, or other IoT device), personal computers, databases, mobile phones, tablet computers, proprietary operational technology (OT), one or more entities, and more.

The network monitor 200 may include a threat actor attribution component 202. The attribution component 202 may access network traffic 206 and may determine one or more observables 207 in view of the network traffic 206. The attribution component 202 may determine a threat actor 208 in view of the one or more observables 207. Optionally, in some examples, the attribution component 202 may perform such operations in response to a cyber incident 204 that may involve a risk of a cyber attack or a compromise of cyber security relating to endpoints 210. Network traffic 206 may include network traffic among endpoints 210. In some examples, the observables 207 may not be grouped into a cyber incident 204, and the network monitor 200 may be configured to identify cyber incidents 204 based on the observables 207.

Threat actor attribution, or simply threat attribution, is the process of identifying the threat actor behind a cyberattack based on observed evidence. Threat attribution helps to detect attacks as early as possible, to understand the probable scope of an attack and to possibly predict the next moves of the threat actor in a victim's network. Despite being very useful, threat attribution is not easy and one of its challenges is combining multiple observables into a single decision.

When a cyberattack occurs, multiple observables can be used to attribute that incident to a specific threat actor, such as a ransomware gang or a state-sponsored advanced persistent threat (APT). These observables include indicators of compromise (IoCs) such as IP addresses, domain names and file hashes, as well as standardized behaviors commonly known as Tactics, Techniques and Procedures (TTPs). Some observables, such as domain names and IP addresses, can often be uniquely mapped to an adversary, but others, such as file hashes and TTPs, are typically shared by many adversaries.

Incidents 204 may also contain new IoCs that have not yet been mapped to any adversary, such as a new IP address or domain name. If threat attribution is performed for an incident that contains new IoCs, that can provide evidence linking the observed IoCs to the actor and this can be shared with the security community in the form of new Cyber Threat Intelligence (CTI).

Aspects of the present disclosure relate to a set of threat attributors using the same interface for IoCs and TTPs that are combined in a modular way to provide a single answer to attribute a threat actor to an incident. Components of a network monitor configured to perform threat actor attribution are described in relation to FIG. 3. An example process flow for performing threat actor attribution is described in relation to FIGS. 4 and 5.

Figure 3:
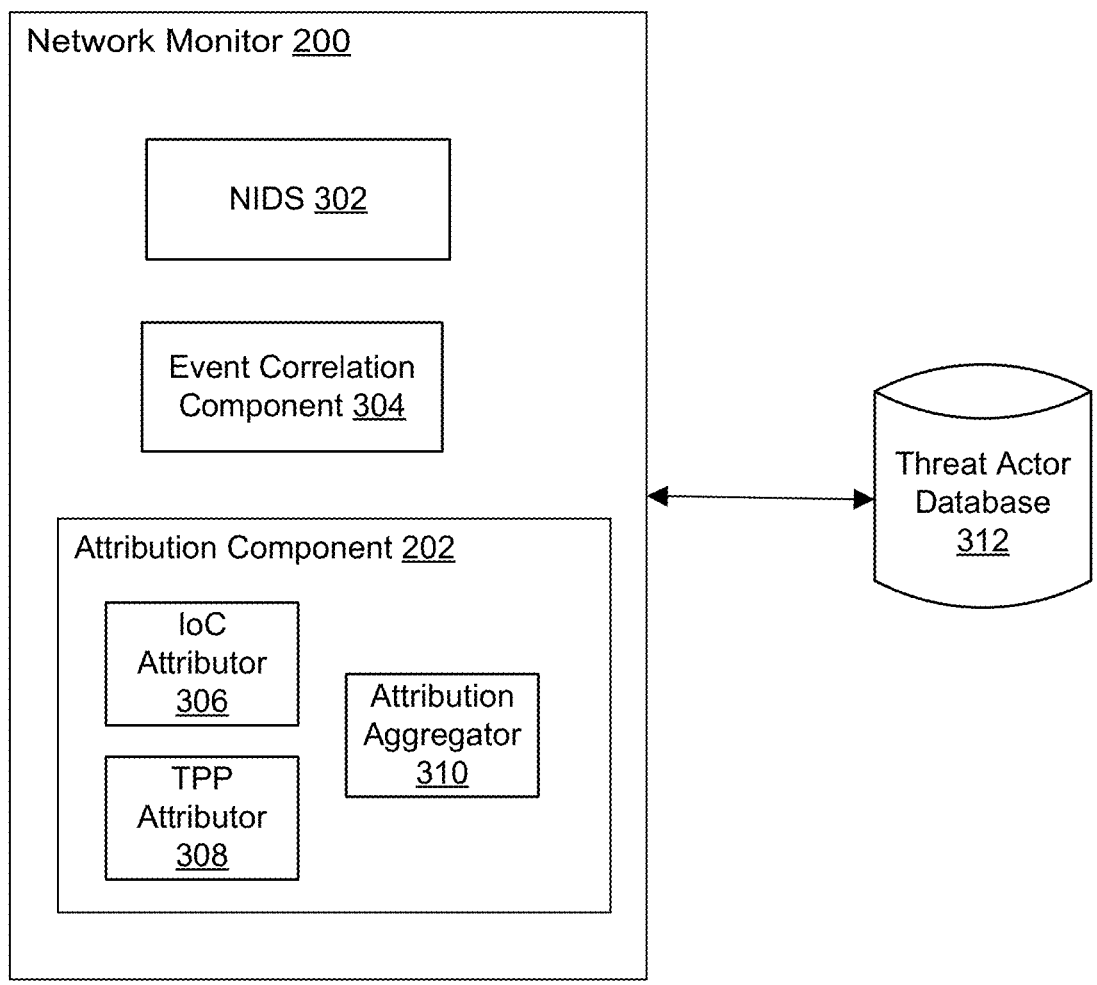
FIG. 3 is an example of a network monitor 200 configured to perform threat actor attribution in accordance with some embodiments of the present disclosure.

FIG. 3 is an example of a network monitor 200 configured to perform threat actor attribution in accordance with some embodiments of the present disclosure. As described above, the network monitor 200 (which may be network monitor 102 of FIG. 1) may be implemented as one or more processing devices. The network monitor 200 may include a network intrusion detection system (NIDS), an event correlation component 304, and the attribution component 202. Although the event correlation component 304 is shown as separate from the NIDS, in some embodiments, the event correlation component 304 can also be included in the NIDS 302. For example, the event correlation component 304 may be a Security Information and Event Management (STEM) system included as part of the NIDS 302.

The attribution component 202 can include an IoC Attributor 306, a TTP Attributor 308, and an attribution aggregator 310. Each of these components may be implemented as hardware, firmware, or software. The network monitor 200 also has access to a threat actor database 312 that includes data that is known about certain threat actors.

The NIDS is configured to detect malicious events from network traffic. An event is any observable occurrence in an information system, and can include alerts, entries in a network log, entries in a host change log, and others. The detected malicious events are sent to the event correlation component 304, which processes the malicious events to extract incidents, i.e., to identify and group events that are part of a single coordinated attack campaign. An incident is a collection of related events.

Embodiments of the present techniques may use any suitable technique for correlating events to identify incidents. In some embodiments, the event correlation component is configured to form correlations based on a data model of the network that is used to contextualize the event data collected and expose the relationships connecting different elements together. For example, the data model may include information describing complexities of the network, e.g., how entities are related to each other (e.g., client server relationship, how they are communicating, etc.), and what information the entities are sharing or communicating. In some embodiments, the data model may further include information of attacks, and how attacks evolve and spread. For example, the data model may include information detailing that the use of Telnet precedes authentication attempts to take control of other entities on a network as part of turning the other entities into part of a network of bots or remotely controlled entities. The relationships in the model between network entities can be used to correlate events to generate an incident, which includes multiple events that are related. Each incident can include one or more identified IoCs and one or more identified TTPs associated with events within the incident.

IoCs are attributors that are known to be associated with malicious actors. Examples of IoC types include IP addresses and domain names associated with known malicious actors, files known to be used malicious actors, and other information. A file known to be used by a malicious actor may be a virus, an executable file such as malware, and others. Such files may be identified according to their hash value, i.e., by computing a file hash.

TTPs are attributors that indicate the types of events or combination of events that are often used by malicious actors. Various types of TTPs may be retrieved from a TTP dictionary, which may include a mapping between specific TTPs and detectable events or event types. Each TTP may be associated with a specific identifier, referred to herein as an attack ID. For example, a list of TTPs may include the following: T1086—PowerShell, T1193—Spearphishing Attachment, T1204—User Execution, T1143—Hidden Window, T1027—Obfuscated Files or Information, T1140—Deobfuscate/Decode Files or Information, T1500—Compile After Delivery, T1089—Disabling Security Tools, T1064—Scripting. It will be appreciated that there may be several additional TTPs other than the limited sample of TTPs listed herein.

Once an incident is identified, the incident can be processed by the attribution component 202 to identify one or more threat actors. The output of the attribution component 202 may be a list of potential threat actors with a corresponding probability assigned to each threat actor, wherein the probability represents the likelihood that the identified threat actor is the true threat actor.

To identify the threat actors, incidents are first processed by the IoC Attributor 306 and TTP Attributor 308. The IoC Attributor 306 matches the observed IoCs in the incident to threat actors described in the threat actor database 312. The output of the IoC Attributor 306 may be a list of threat actors (identified by name or other identifier) and a Probability Function that describes the probability of attribution to each of the listed threat actors. In some embodiments, the probability function may be a Probability Density Function (PDF) or a Probability Mass Function (PMF). A different threat actor and corresponding probability function may be identified for each separate IoC type included in the incident (IP address, domain name, file hash.)

The TTP Attributor 308 matches the observed TTPs in the incident to threat actors described in the threat actor database 312. The output of the TTP Attributor 308 may be a list of threat actors (identified by name or other identifier) and a probability function that describes the probability of attribution to each of the listed threat actors.

The attribution aggregator 310 receives the output probability functions of the IoC Attributor 306 and TTP Attributor 308 and combines these to form a single output prediction, which may be added to or otherwise associated with the incident. The output of the attribution aggregator 310 may be a single identified threat actor that represents the most likely threat actor behind the incident or a list of possible threat actors and another probability function that describes the probability of attribution for each of the listed threat actors. This attributed incident can be analyzed by a security analyst that uses the information for incident response. The incident can also lead to the generation of new public CTI, in cases where there are new IoCs that were not previously associated to any threat actor. More detailed embodiments of the operations described above are described in relation to FIG. 4.

Figure 4:
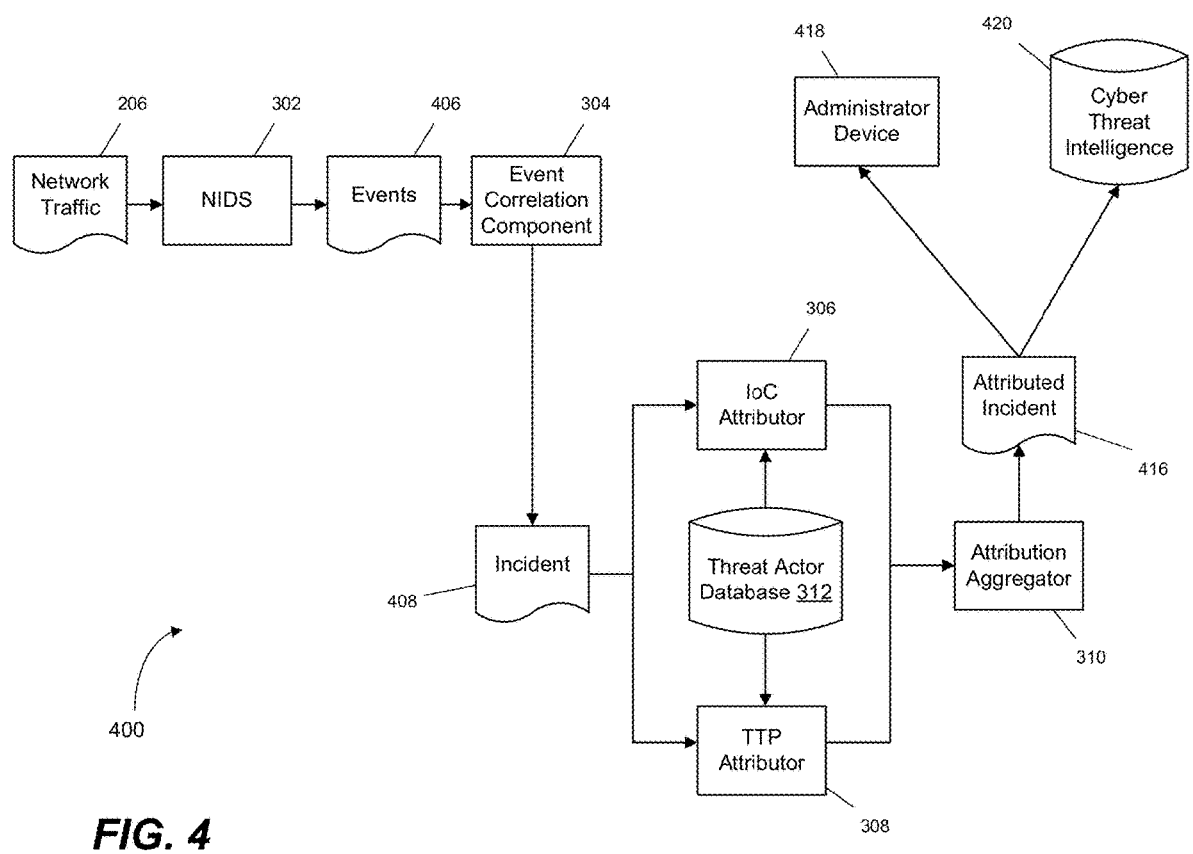
FIG. 4 is a process flow of an example method of performing threat actor attribution in accordance with some embodiments of the present disclosure.

FIG. 4 is a process flow of an example method of performing threat actor attribution in accordance with some embodiments of the present disclosure. The process may be performed by the network monitor 200 described in relation to FIG. 3. It will be appreciated that various alterations may be made to the process illustrated in FIG. 4 and that some components or processes may be omitted or added without departing from the scope of the disclosure.

The process may begin with the NIDS 302 receiving network traffic 206. Network traffic 206 may be obtained on a continuous basis through the monitoring techniques described above. The NIDS 302 processes the network traffic 206 to identify malicious, or suspected malicious, events 406. The events 406 are sent to the event correlation component 304, which correlates the events to generate incidents 408 as described above. When an incident 408 is identified, the incident 408 (which includes all of the information related to the incident, e.g. the events) is sent to the IoC attributor 306 and the TTP attributor 308.

The IoC attributor 306 may perform a separate attribution process for each type of IoC included in the event. Thus, the IoC attributor 306 may include a separate attribution algorithm for each type of IoC, which may include an IP address IoC type, a domain name IoC type, and a file hash IoC type. Accordingly, the IoC attributor 306 may include an IP address attributor that processes IoCs of the IP address IoC type, a domain name attributor that processes IoCs of the domain name IoC type, and a file hash attributor that processes IoCs of the file hash IoC type. All these attributors work similarly, while operating on different observables of an incident. The attribution process may use available CTI obtained from the threat actor database 312.

More specifically, for each IoC extracted from the incident, the IoC is mapped to one or more threat actors based on finding a matching IoC in the threat actor database. The probability of attribution to each threat actor for that IoC type can be equal to the number of IoCs of the same type mapped to that actor, normalized such that each of the probabilities sum to one (i.e., 100 percent). In other words, the probability of attribution to a specific threat actor is the number of mappings to that threat actor divided by the total number of mappings for all of the threat actors. The list of actors and the associated probabilities is the probability function for that IoC type. Separate probability functions may be computed for each IoC type, forming, for example, a probability function for the IP addresses, a probability function for domain names, and a probability function for the file hashes.

For example, if the IoC is an IP address, each threat actor that is associated with the same IP address is mapped to that IoC. Assuming that multiple IP addresses are associated with the incident, the same mapping will be performed for each of the multiple IP addresses. Each mapping is then used to compute the probability function. Assuming, for example, that the incident includes four IP address, three of which map to actor A, two of which map to actor B, and zero of which map to actor C, the output probability function for the IP address IoC type would be (Actor A: 0.6, Actor B: 0.4, Actor C: 0). The same process can be performed for each IoC type to generate, for example, an output probability function for the domain name IoC type, and a probability function for the file hash IoC type.

In some embodiments, the output, for each type of IoC, may be a common name of the threat actor to which the incident is attributed and the probability function from which this attribution was derived. In some embodiments, the IoC attribution may only be performed if the maximum probability exceeds a minimum confidence threshold and there are no two threat actors having the same or substantially similar probability.

The TTP attributor 308 also uses a mapping of threat actors to known TTPs. However, since it is often the case that several threat actors may use similar TTPs, the TTP attributor 308 is configured as a machine learning classifier, such as k-Nearest Neighbors (KNN) classifier, or a Naïve Bayes classifier. The TTP attributor 308 may be trained using data present in the threat actor database, which serves as a mapping between threat actors and their known previously used TTPs. Each time a new incident 408 is acquired, the TTPs may be extracted from the incident 408 and input to the trained TTP attributor 308 to generate an output probability function, which includes a list of one or more threat actors and a probability associated with each threat actor.

The attribution aggregator 310 combines the probability functions generated by the IoC attributor 306, and the TTP attributor 308 into a single probability function using opinion pools. Opinion pools are functions that combine probability functions into a single aggregate probability function. These pooling functions can be applied to probability density functions (PDFs) and Probability Mass Functions (PMFs). Various opinion pools exist, including the linear opinion pool and the logarithmic opinion pool. The linear opinion pool is computed as an arithmetic average, as shown in Equation 1, where the function g produces the aggregate probability function and $q_k(\theta)$ describes the input probability functions. The logarithmic opinion pool is computed as the geometric average, as shown in Equation 2, where c is a normalization factor. Both pools can be weighted using a weighting factor, $w_k$, for each input probability function.

$$g_{linear}[q1, \ldots, qK](\theta) = \Sigma_{k=1}^{k} w_k q_k(\theta) \quad \text{Eq. 1}$$

$$g_{logarithmic}[q1, \ldots, qK](\theta) = c\Pi_{k=1}^{k} q_k(\theta)^{w_k} \quad \text{Eq. 2}$$

To combine the probability functions, the attribution aggregator 310 may form each of the possible pairs of probability functions generated by the IoC attributor 306 and the TTP attributor 308. For example, the attribution aggregator 310 may form each possible pairing of the four probability functions described above, namely, the probability function for the IP address IoC type, the probability function for the domain name IoC type, the probability function for the file hash IoC type, and the probability function generated by the TTP, which results in six different pairings.

The resulting pairs of probability functions are combined to form an intermediate probability function for each pair using a logarithmic opinion pool, as shown in Equation 2. Continuing with the example described above in which six pairings are formed between four separate probability functions, this means that four intermediate probability functions will be computed. The logarithmic opinion pool can be weighted to account for the importance of specific IoC and TTP attributors. For example, different weights may be assigned to the probability functions depending on the IoC type that the probability function is based on or whether it is a TTP-based probability function. In some embodiments, the weight assigned to each attributor may be predetermined, for example, by a subject matter expert and/or a system administrator.

Next the attribution aggregator 310 may combine the intermediate probability functions into a single aggregate probability function using a linear opinion pool as shown in Equation 1. This single aggregate probability function is the final probability function, from which the definitive attribution can be derived.

The attribution derived from the aggregate probability function may be added to the incident to generate the attributed incident 416. The attribution may include the identification (e.g., common name) of a threat actor and the probability associated with the threat actor. The attribution may also include the identification of more than one threat actor and their associated probabilities. For example, all of the threat actors with a non-zero probability may be identified or a specified number of threat actors with the highest probabilities may be identified. The attributed incident 416 can be sent to an administrator device 418 (e.g., security analyst device). The administrator can then use the information to determine a course of action, such as a corrective response. In cases in which, there are new IoCs that were not previously associated with any threat actor, the incident can also lead to the generation of new public CTI, which may be sent to CTI database 420.

One advantage of the aspects described in the present disclosure is that they allow for automatic and precise threat actor attribution of real-world incidents, which are based on multiple observed evidence. Aspects of the present disclosure have the potential to greatly reduce the analyst effort for threat attribution, especially when threat actors change their TTPs or use new IoCs. With an increasing set of tracked threat actors, aspects of the present disclosure may attribute detected incidents to known threat actors and enrich public cyber threat intelligence with new facts detected at customer networks.

Figure 5:
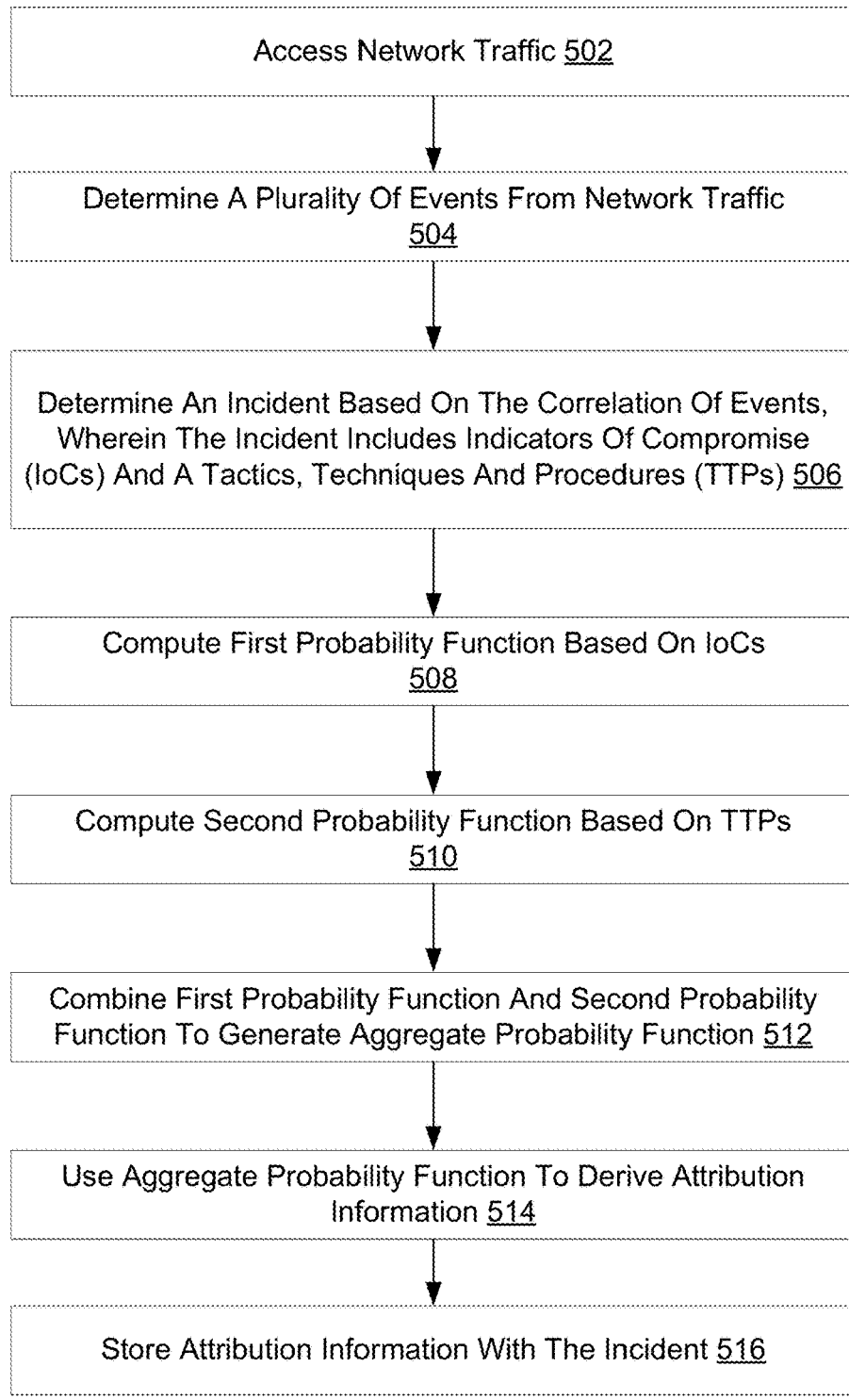
FIG. 5 is a process flow diagram for a method for threat attribution, in accordance with some embodiments of the present disclosure.

FIG. 5 is a process flow diagram for a method for threat attribution, in accordance with some embodiments of the present disclosure. Various portions of the method 500 may be performed by different components (e.g., components of system 600) of an entity (e.g., network monitor device 102 or network monitor device 200). The method 500 may be performed on a periodic basis, in response to a prompt (e.g., user prompted basis), a schedule, cloud service based schedule, or based on a policy.

At block 502, traffic data is accessed. The traffic may be accessed by a network monitoring entity (e.g., network monitoring devices 102 or 200) via a port mirroring or SPAN port. The traffic data may include one or more properties for each entity communicatively coupled to one or more networks. The traffic may include active scanning properties (e.g., if active scanning is enabled). The traffic may be used to classify entities of a network. The traffic may be used to determine various information, e.g., properties, associated with the entities of the network.

In some embodiments, entity related information may be accessed, from traffic or other sources, as described herein, including, but not limited to, vulnerability of entities, classification of entities, IP address information associated with entities, entity type information (e.g., controller, PLC, SCADA, server, IoT, etc.), network communication (e.g., the other entities an entity communicates with and the kind of communication exchanged), environment (e.g., branch office, factory, refinery, IT, etc.), vertical (e.g., business or industry), etc.

At block 504, a plurality of events associated with the network traffic is determined. The plurality of events may include alerts, entries in network logs, and entries in host change logs. The events, alerts, etc., may be determined based on intrusion detection functionality that is configured to match events to signatures, one or more databases, heuristics, and machine learning based on various factors. The events may be determined based on the data model, as described herein. In some embodiments, the events may be accessed from another system (e.g., an entity with intrusion detection functionality, for instance, system 150, an external system, SIEM, SOAR, etc.).

At block 506, an incident is determined based on a correlation of a portion of the plurality of events as being associated with a same coordinated attack. The events may be correlated based on the data model, as described herein, thereby allowing correlation of events based on information about the network. In some embodiments, this may be based on clustering, event chains, and pattern matching. In some embodiments, the correlation of events may be based on grouping events based on data associated with the events including common features or commonalities and specific information of networks. The grouping or correlations may be based on different rules and algorithms including automatic (e.g., performed without human involvement) algorithms. The correlations can be based on common hosts or entities, industrial protocols, IoCs, TTPs, vulnerabilities, and other information extracted from the network. Events may be correlated or aggregated to an incident based on event type, source, destination, and protocol. Embodiments may support selection of different algorithms to be used for correlating events. The algorithms may be selected by a user or automatically based on information associated with a network or the data model.

The incident will include a plurality of indicators of compromise (IoCs) and Tactics, Techniques and Procedures (TTPs). The IoCs may include multiple types of IoCs. The IoC types may including an IP address IoC type, a domain name IoC type, and a file hash IoC type, among others.

At block 508, a first probability function is computed based on the IoCs, wherein the first probability function comprises a first set of probabilities of attribution for a first list of known threat actors. In some embodiments, additional probability functions may also be computed, where each probability function is based on the IoC of a specific type. For example, the first probability function may be computed for the IP address IoC type, another probability function may be computed based on the IoCs of the domain name IoC type, and another probability function can be computed based on the IoCs of the file hash IoC type. Additional probability functions may be computed for additional IoC types. Each probability function computed in block 508 includes a set of probabilities of attribution for a list of known threat actors, i.e., a list of threat actors wherein each threat actor is associated with a probability of attribution that indicates the likelihood that the threat actor is the true threat actor behind the incident.

The probability functions may be probability density functions (PDFs) or probability mass functions (PMFs). The probability functions may be computed using any suitable technique. In some embodiments, the probability function is computed by, for each IoC type, mapping each IoC to one or more threat actors based on finding a matching IoC in a threat actor database, and for each specific threat actor, computing the probability of attribution for the specific threat actor as the number of IoCs mapped to the specific threat actor divided by a total number of mappings for all of the threat actors.

At block 510, a second probability function is computed based on the TTPs. The second probability function comprises a second set of probabilities of attribution for a second list of known threat actors. The lists of threat actors contained in the probability functions computed at block 508 and 510 may or may not contain the same threat actors, and there may be overlap between the lists. The second probability function may be computed by inputting the TTPs to a trained classifier.

At block 512, the first probability function and the second probability function are combined to generate an aggregate probability function. The combining performed at block 512 may also combine any additional probability functions computed at block 508. The probability functions may be combined using opinion pools. In some embodiments, combining the probability functions includes forming a plurality of pairings comprising each possible pairing of the probability functions. For each pairing, an intermediate probability function is computed by combining the paired probability functions using a logarithmic opinion pool. Each of the intermediate probability functions is combined using a linear opinion pool to generate the aggregate probability function. The aggregate probability function includes a list of threat actors wherein each threat actor is associated with a probability of attribution that indicates the likelihood that the threat actor is the true threat actor behind the incident.

At block 514, the aggregate probability function is used to derive attribution information. For example, deriving attribution information may include identifying the threat actor with the highest probability of attribution as the threat actor behind the incident. In some embodiments, deriving attribution information may include identifying a number of threat actors that may be behind the incident, for example, a specific number of threat actors with the highest probability of attribution, or any threat actors that have a probability of attribution above a threshold.

At block 516, the attribution information is stored with the incident. The attribution information may include any threat actors identified at block 514 and may also include the probability of attribution associated with the threat actors. The incident, with the attribution information, may be stored to a database such as the threat actor database 312 of FIG. 3 or the cyber threat intelligence database 420 of FIG. 4. The incident, with the attribution information, may also be sent to a computing device of a user (e.g., security analyst) and displayed using a graphical user interface.

It will be appreciated that various alterations may be made to the process illustrated in FIG. 5 and that some processes may be omitted or added without departing from the scope of the disclosure.

Figure 6:
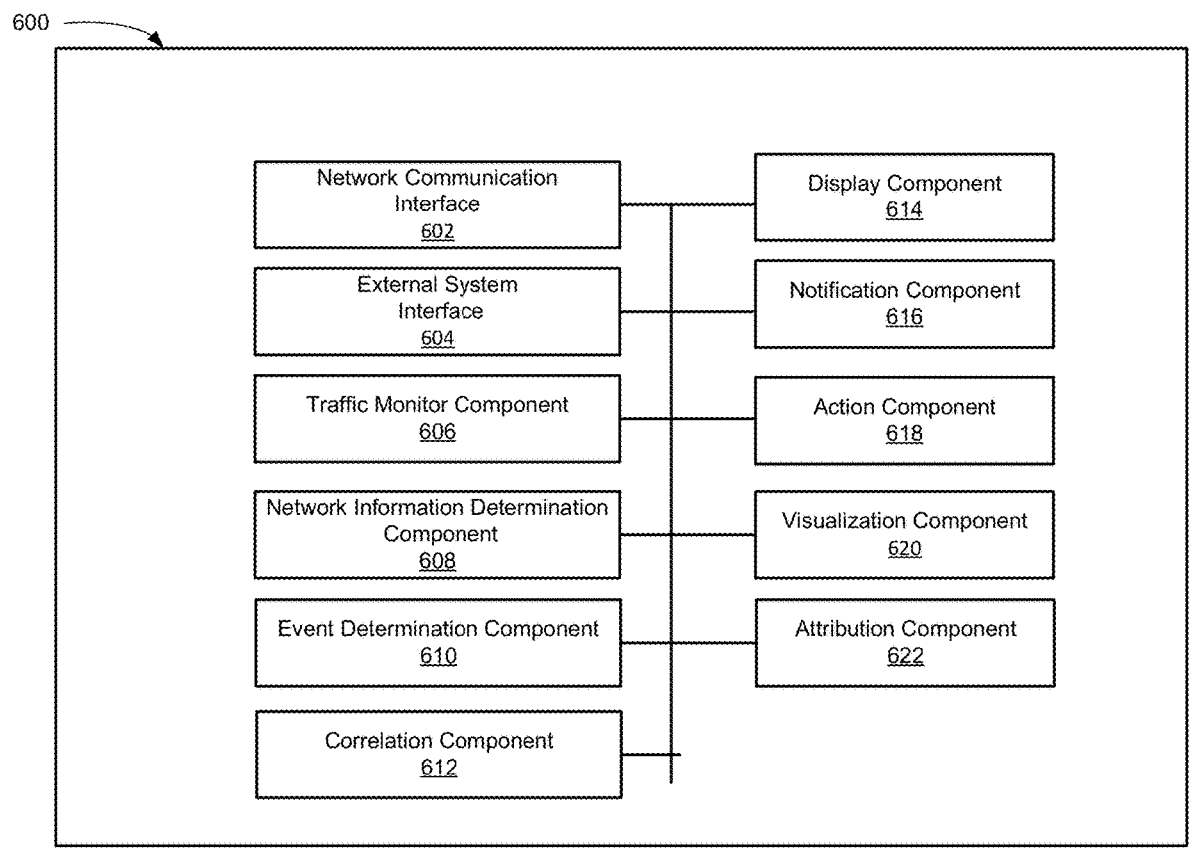
FIG. 6 depicts illustrative components of a system for determining one or more incidents based on a plurality of events in accordance with some embodiments of the present disclosure.

FIG. 6 depicts illustrative components of a system for determining one or more incidents based on a plurality of events in accordance with some embodiments of the present disclosure. It will be appreciated that FIG. 6 illustrates example components used by various embodiments. Although specific components are disclosed in system 600, it should be appreciated that such components are examples. That is, embodiments are well suited to having various other components or variations of the components recited in system 600. It is appreciated that the components in system 600 may operate with other components than those presented, and that not all of the components of system 600 may be required to achieve the goals of system 600.

Example system 600 or event analyzer 600 includes a network communication interface 602, an external system interface 604, a traffic monitor component 606, a network information determination component 608, an event determination component 610, a correlation component 612, a display component 614, a notification component 616, an action component 618, a visualization component 620, and an attribution component 622. The components of system 600 may be part of a computing system or other electronic device (e.g., network monitor devices 102 or 200) or a virtual machine or device and be operable to monitor one or more entities communicatively coupled to a network, monitor network traffic, and classify the one or more entities, determine one or more incidents, as described herein. For example, the system 600 may further include a memory and a processing device, operatively coupled to the memory, which may perform the operations of or execute the components of system 600. The components of system 600 may access various data and characteristics or properties associated with an entity (e.g., network communication information or traffic), data associated with one or more entities (e.g., from network devices, local resources, cloud resources, external systems, for instance system 150), etc., as described herein. It is appreciated that the modular nature of system 600 may allow the components to be independent and allow flexibility to enable or disable individual components or to extend, upgrade, or combination thereof components without affecting other components thereby providing scalability and extensibility. System 600 may perform one or more blocks of flow diagram 500.

Communication interface 602 is operable to communicate with one or more entities (e.g., network device 104, aggregation device 106, devices 120-130, endpoints 210, etc.) coupled to a network that are coupled to system 600 and receive or access information about entities (e.g., device information, device communications, device characteristics, properties, etc.), access information as part of a passive scan, send one or more requests as part of an active scan, receive active scan results or responses (e.g., responses to requests), access events determined by another system, as described herein. The communication interface 602 may be operable to work with one or more components to initiate access to characteristics or determination of characteristics of an entity to allow determination of one or more properties which may then be used for device compliance, asset management, standards compliance, classification, identification, etc., as described herein. Communication interface 602 may be used to receive and store network traffic for determining properties, as described herein.

External system interface 604 is operable to communicate with one or more third party, remote, or external systems to access information including characteristics or attributes associated with an entity, events, etc. External system interface 604 may further store the accessed information in a data store. For example, external system interface 604 may access information from a vulnerability assessment (VA) system to enable determination of one or more compliance or risk characteristics associated with the entity. External system interface 604 may be operable to communicate with a vulnerability assessment (VA) system, an advanced threat detection (ATD) system, a mobile device management (MDM) system, a firewall (FW) system, a switch system, an access point (AP) system, etc. External system interface 604 may query a third party system using an API or CLI. For example, external system interface 604 may query a firewall or a switch for information (e.g., network session information) about an entity or for a list of entities (e.g., an ARP table) that are communicatively coupled to the firewall or switch and communications associated therewith. In some embodiments, external system interface 604 may query a switch, a firewall, or other system for information of communications or properties associated with an entity.

Traffic monitor component 606 is operable to monitor network traffic to determine if a new entity has joined the network or an entity has rejoined the network and monitor traffic for analysis by a network information determination component 608, an event determination component 610, a correlation component 612, a visualization component 620, among others, as described herein. Traffic monitor component 606 may have a packet engine operable to access packets of network traffic (e.g., passively) and analyze the network traffic. The traffic monitor component 606 may further be able to access and analyze traffic logs from one or more entities (e.g., network device 104, system 150, or aggregation device 106) or from an entity being monitored. The traffic monitor component 606 may further be able to access traffic analysis data associated with an entity being monitored, e.g., where the traffic analysis is performed by a third-party system.

Network information determination component 608 is operable for determining information about a network and entities of the network. Network information determination component 608 may determine a data model for the network based on communications between entities, relationships between entities (e.g., client and server, SCADA server, engineering workstation, PLC, etc.), entity types, entity information, vertical, environment, common types of devices on the network, segments, etc., as described herein.

Event determination component 610 is operable to determine events based on information (e.g., accessed via network communication interface 602, external system interface 604, etc.). The events may be determined from alerts, network logs, host or entity changes logs, etc., as described herein. In some embodiments, the events may be determined based on intrusion detection system functionality of event determination component 610.

Correlation component 612 is operable to determine one or more incidents based on the events (e.g., determined by event determination component 610 or accessed from another system), as described herein. The incidents may be determined by correlation including a variety of algorithms including aggregation, event chaining, clustering, and pattern matching, as described herein. The correlations may be based on an event type, a source of a communication, a destination of a communication, and a protocol, as described herein. Correlation component 612 may further determine a priority (e.g., based on severity) and category (e.g., security, operational, etc.), as described herein.

The attribution component 622 is configured to add attribution information to an incident based on comparison of the event with data from a database of known threat actors, as described above.

Display component 614 is configured to optionally display one or more graphical user interfaces or other interfaces (e.g., command line interface) for depicting various information associated with entities or devices, incidents, details associated with incidents, event details, etc., as described herein.

Notification component 616 is operable to initiate one or more notifications based on the results of monitoring communications or attributes of one or more entities (e.g., alerting of one or more incidents, for example, incidents with a high priority, etc.), as described herein. The one or more notifications could also include an operational issue or a security issue, as described herein. The notification may be any of a variety of notifications, e.g., IT ticket, email, SMS, a HTTP notification, etc., as described herein.

Action component 618 is operable for initiating or triggering one or more remediation actions or security actions according to one or more policies, e.g., based on an incident, as described herein. The action component 618 may further be configured to perform operations based on information included in the incident, including the threat attribution information generated in accordance with embodiments of the present disclosure. Action component 618 may further be configured to perform other operations including checking compliance status, finding open ports, etc. Action component 618 may restrict network access, signal a patch system or service, signal an update system or service, etc. The action component 618 may thus, among other things, invoke automatically patching, automatically updating, and automatically restrict network access of an entity (e.g., that has out-of-date software or based on access rule violation or attempted violation), automatic change of an entity to another network portion (e.g., VLAN), as described herein.

The actions may include restricting network access to a particular level (e.g., full, limited, or no network access), remediation actions (e.g., triggering patch systems or services, triggering update systems or services, triggering third party product action, etc.), informational actions (e.g., sending an email notification about the incident to a user or IT administrator or creating an IT ticket reflecting the level of compliance), and logging actions (e.g., logging or storing the incident).

Visualization component 620 is operable to determine visual representations of incidents and the associated entities. The visual representations may include graphs of entities and events associated with an incident at various points in time, as described herein. This may allow a user (e.g., analyst) to view the start of an incident and the progression of the incident over time.

The system 600 may be software stored on a non-transitory computer readable medium having instructions encoded thereon that, when executed by a processing device, cause the processing device to access network traffic from a network and access a plurality of events associated with the network traffic. The instructions may further cause the processing device to determine an incident based on a correlation of a portion of the plurality of events. The incident represents an incident associated with the portion of the plurality of events. The correlation of the portion of the plurality of events is based on network specific information. The instructions may further cause the processing device to storing information associated with the incident including the portion of the plurality of events.

In some embodiments, the network specific information comprises at least one of information of communications of entities on the network, information of a relationship of entities of the network, or information of entity types of entities on the network. In various embodiments, the correlation of the portion of the plurality of events is based on at least one of an aggregation, clustering, pattern matching, event chaining, risk posture, or vulnerabilities. In some embodiments, the instructions may further cause the processing device to determine a category associated with the incident, wherein the category associated with the incident comprises at least one of security or operational. In various embodiments, the instructions may further cause the processing device to determine a priority associated with the incident, wherein the priority associated with the incident comprises at least one of critical, high, medium, low, or informational. In some embodiments, the instructions may further cause the processing device to access information associated with the network, wherein the information associated with the network comprises a model comprising one or more relationships of entities of the network.

In various embodiments, at least one of the events is determined by an intrusion detection system. In some embodiments, the correlation is based on at least one of an event type, a source of a communication, or a destination of the communication. In various embodiments, at least one of the events is associated with an operational technology (OT) entity. In some embodiments, the instructions may further cause the processing device to determine the plurality of events associated with the network traffic.

Figure 7:
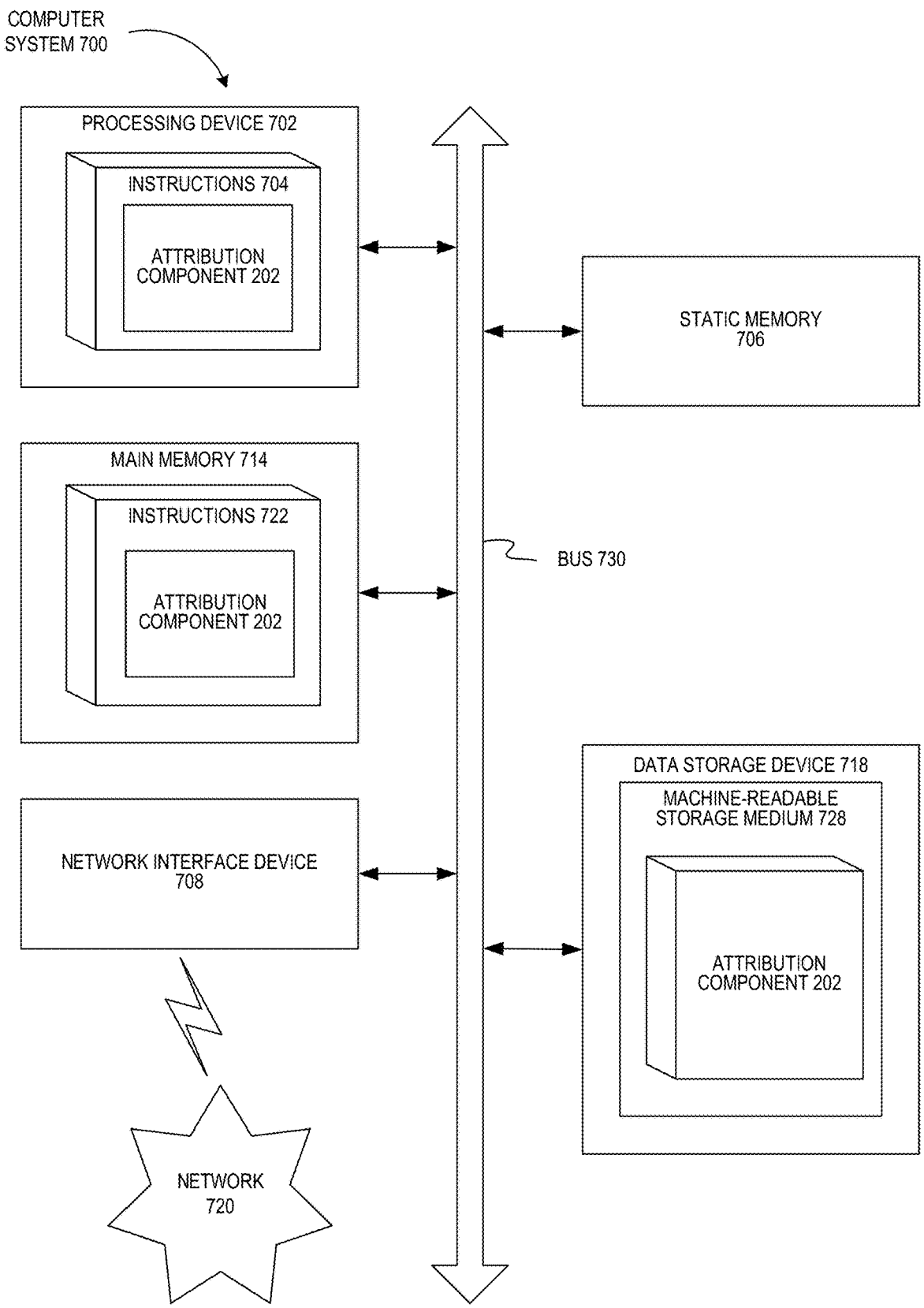
FIG. 7 is a block diagram illustrating an example computer system 700, in accordance with some embodiments of the present disclosure.

FIG. 7 is a block diagram illustrating an example computer system 700, in accordance with some embodiments of the present disclosure. This can be understood as a diagrammatic representation of a machine in the example form of a computer system within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet.

The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In some embodiments, computer system 700 may be representative of a server, such as the network monitor 102 or 200 that runs an attribution component 202 to perform the operations as described herein.

The exemplary computer system 700 includes a processing device 702, a main memory 714 (e.g., read-only memory (ROM), flash memory, dynamic random access memory (DRAM)), a static memory 706 (e.g., flash memory, static random access memory (SRAM), etc.), and a data storage device 718, which communicate with each other via a bus 730. Any of the signals provided over various buses described herein may be time multiplexed with other signals and provided over one or more common buses. Additionally, the interconnection or coupling between circuit components or blocks may be shown as buses or as single signal lines. Each of the buses may alternatively be one or more single signal lines and each of the single signal lines may alternatively be buses.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 704 which may include the attribution component 702, for performing the operations and blocks discussed herein.

The data storage device 718 may include a machine-readable storage medium 728, on which is stored one or more set of instructions 722 (e.g., software) embodying any one or more of the methodologies of operations described herein, including instructions to cause the processing device 702 to execute an attribution component 202. The instructions 722 may also reside, completely or at least partially, within the main memory 714 or within the processing device 702 during execution thereof by the computer system 700; the main memory 714 and the processing device 702 also constituting machine-readable storage media. The instructions 722 may further be transmitted or received over a network 720 via the network interface device 708.

The machine-readable storage medium 728 may also be used to store instructions to perform a method for determining a threat actor associated with a cyber incident, as described herein. While the machine-readable storage medium 728 is shown in an exemplary embodiment to be a single medium, the term "machine-readable storage medium" should be taken to include a single medium or multiple media (e.g., a centralized or distributed database, or associated caches and servers) that store the one or more sets of instructions.

A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

When an action, function, operation, etc., is described herein as being performed automatically, this may indicate that the action, function, operation, etc., may be performed without requiring human or user input, invocation, or interaction.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

What is claimed is:

1. A method, comprising:
accessing network traffic from a network;
accessing a plurality of events associated with the network traffic;
determining an incident based on a correlation of a portion of the plurality of events as being associated with a same coordinated attack, wherein the incident comprises indicators of compromise (IoCs) and Tactics, Techniques and Procedures (TTPs);
computing a first probability function based on the IoCs, wherein the first probability function comprises a first set of probabilities of attribution for a first list of known threat actors;
computing a second probability function based on the TTPs, wherein the second probability function comprises a second set of probabilities of attribution for a second list of known threat actors;
generating an aggregate probability function by combining the first probability function and the second probability function;
using the aggregate probability function to derive attribution information; and
storing the attribution information with the incident.

2. The method of claim 1, wherein computing the first probability function comprises:
for each IoC, mapping the IoC to one or more threat actors based on finding a matching IoC in a threat actor database; and
for each specific threat actor, computing the probability of attribution for the specific threat actor as a number of IoCs mapped to the specific threat actor divided by a total number of mappings for all of the threat actors.

3. The method of claim 1, wherein computing the second probability function comprises inputting the TTPs to a trained classifier.

4. The method of claim 1, wherein the IoCs are grouped into multiple IoC types comprising a first IoC type and at least a second IoC type, and wherein the first probability function is computed for the first IoC type, the method further comprising:
computing at least a third probability function based on the IoCs of the second IoC type, wherein the third probability function comprises a third set of probability of attributions for a third list of known threat actors.

5. The method of claim 4, wherein generating the aggregate probability function comprises combining the first probability function, the second probability function, and the third probability function.

6. The method of claim 4, wherein the multiple IoC types comprise an IP address IoC type, a domain name IoC type, and a file hash IoC type.

7. The method of claim 4, wherein generating the aggregate probability function comprises:
forming a plurality of pairings comprising each possible pairing of the first probability function, the second probability function, and at least the third probability function;
for each of the plurality of pairings, computing an intermediate probability function by combining each probability function in the pairing using a logarithmic opinion pool; and
combining the intermediate probability functions using a linear opinion pool.

8. The method of claim 7, wherein the logarithmic opinion pool is weighted by assigning weights to each probability function in the pairing depending on an IoC type that the probability function is based on and whether the probability function is a TTP-based probability function.

9. The method of claim 1, comprising performing a network action based, at least in part, on the attribution information stored with the incident.

10. The method of claim 9, wherein the network action comprises one of:
restricting network access;
triggering a patch system or an update system;
sending an email notification about the incident to a user or administrator; and
logging the incident.

11. A system comprising:
a memory; and
a processing device, operatively coupled to the memory, to:
access network traffic from a network;
access a plurality of events associated with the network traffic;
determine an incident based on a correlation of a portion of the plurality of events as being associated with a same coordinated attack, wherein the incident comprises indicators of compromise (IoCs) and a Tactics, Techniques and Procedures (TTPs);
compute a first probability function based on the IoCs, wherein the first probability function comprises a first set of probabilities of attribution for a first list of known threat actors;
compute a second probability function based on the TTPs, wherein the second probability function comprises a second set of probabilities of attribution for a second list of known threat actors;
generate an aggregate probability function by combining the first probability function and the second probability function;
use the aggregate probability function to derive attribution information; and
store the attribution information with the incident.

12. The system of claim 11, wherein to compute the first probability function, the processing device is to:
  for each IoC, map the IoC to one or more threat actors based on finding a matching IoC in a threat actor database; and
  for each specific threat actor, compute the probability of attribution for the specific threat actor as a number of IoCs mapped to the specific threat actor divided by a total number of mappings for all of the threat actors.

13. The system of claim 11, wherein the IoCs are grouped into multiple IoC types comprising a first IoC type and at least a second IoC type, and wherein the first probability function is computed for the first IoC type, and wherein the processing device is further to:
  compute at least a third probability function based on the IoCs of the second IoC type, wherein the third probability function comprises a third set of probability of attributions for a third list of known threat actors.

14. The system of claim 13, wherein the multiple IoC types comprise an IP address IoC type, a domain name IoC type, and a file hash IoC type.

15. The system of claim 13, wherein to generate the aggregate probability function, the processing device is to:
  form a plurality of pairings comprising each possible pairing of the first probability function, the second probability function, and at least the third probability function;
  for each of the plurality of pairings, compute an intermediate probability function by combining each probability function in the pairing using a logarithmic opinion pool; and
  combine the intermediate probability functions using a linear opinion pool.

16. The system of claim 15, wherein the logarithmic opinion pool is weighted by assigning weights to each probability function in the pairing depending on an IoC type that the probability function is based on and whether the probability function is a TTP-based probability function.

17. A non-transitory computer readable medium having instructions encoded thereon that, when executed by a processing device, cause the processing device to:
  access network traffic from a network;
  access a plurality of events associated with the network traffic;
  determine an incident based on a correlation of a portion of the plurality of events as being associated with a same coordinated attack, wherein the incident comprises indicators of compromise (IoCs) and a Tactics, Techniques and Procedures (TTPs);
  compute a first probability function based on the IoCs, wherein the first probability function comprises a first set of probabilities of attribution for a first list of known threat actors;
  compute a second probability function based on the TTPs, wherein the second probability function comprises a second set of probabilities of attribution for a second list of known threat actors;
  generate an aggregate probability function by combining the first probability function and the second probability function;
  use the aggregate probability function to derive attribution information; and
  store the attribution information with the incident.

18. The non-transitory computer readable medium of claim 17, wherein to compute the first probability function, the instructions cause the processing device is to:
  for each IoC, map the IoC to one or more threat actors based on finding a matching IoC in a threat actor database; and
  for each specific threat actor, compute the probability of attribution for the specific threat actor as a number of IoCs mapped to the specific threat actor divided by a total number of mappings for all of the threat actors.

19. The non-transitory computer readable medium of claim 17, wherein to compute the second probability function, the instructions cause the processing device to input the TTPs to a trained classifier.

20. The non-transitory computer readable medium of claim 17, wherein the IoCs are grouped into multiple IoC types comprising an IP address IoC type, a domain name IoC type, and a file hash IoC type, and wherein the first probability function is computed for the IP address IoC type, and wherein the instructions cause the processing device further to:
  compute a third probability function based on the IoCs of the domain name IoC type, wherein the third probability function comprises a third set of probability of attributions for a third list of known threat actors;
  compute a fourth probability function based on the IoCs of the file hash IoC type, wherein the fourth probability function comprises a fourth set of probability of attributions for a fourth list of known threat actors;
  form a plurality of pairings comprising each possible pairing of the first probability function, the second probability function, and the third probability function, and the fourth probability function;
  for each of the plurality of pairings, compute an intermediate probability function by combining each probability function in the pairing using a logarithmic opinion pool; and
  combine the intermediate probability functions using a linear opinion pool to generate the aggregate probability function.

* * * * *